United States Patent Office 2,855,718
Patented Oct. 14, 1958

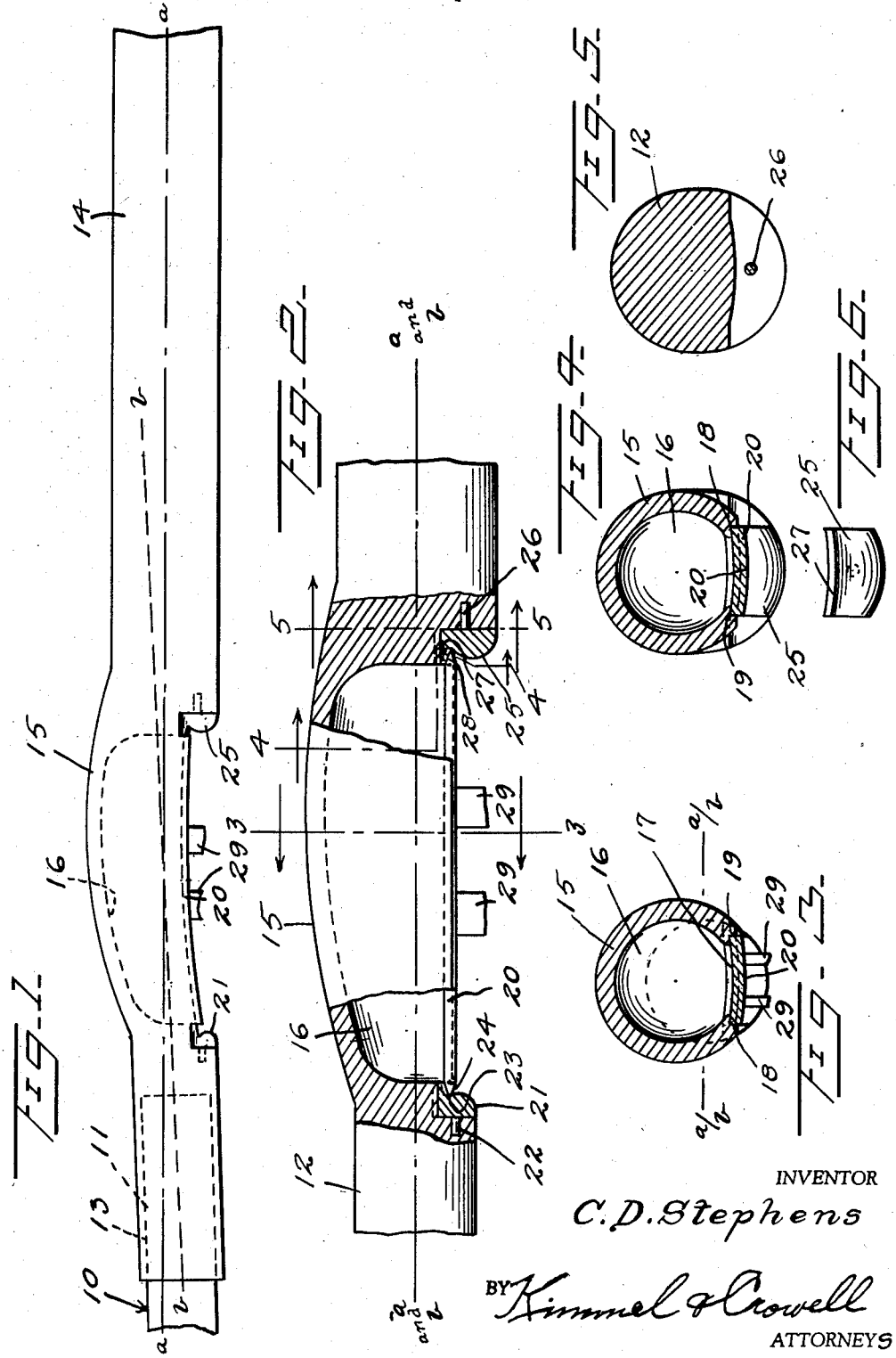

2,855,718

FISHING ROD ATTACHED REEL CLAMP AND SEAT

Charles D. Stephens, San Antonio, Tex.

Application September 26, 1955, Serial No. 536,599

3 Claims. (Cl. 43—22)

The present invention relates to fishing rod attached reel clamps and seats, and more particularly to such structures which incorporate no moving parts.

The primary object of this invention is to provide in the handle portion of a fishing rod a reel lock including a reel seat and clamp which is adapted by flexing to permit the engagement and disengagement of the reel therewith without otherwise moving any of the parts thereof.

Another object of the invention is to provide a fishing rod having a combined clamp and seat formed in the handle portion thereof in which the clamp is caused to grip the reel at the ends thereof under tension.

A further object of the invention is to provide a combined reel clamp and seat in the handle portion of a fishing rod in which downward pressure from the tip of the fishing rod will cause the clamp to more tightly engage the reel.

A still further object of the invention is to produce a device of the class described above which will be inexpensive to manufacture, easy to operate and simple to repair.

Other objects and advantages will become apparent in the following specification when considered in the light of the attached drawing, in which:

Figure 1 is a fragmentary side elevation view of the invention;

Figure 2 is an enlarged fragmentary side elevation view of the invention, shown partly in section;

Figure 3 is a transverse cross-section of the reel lock taken along the line 3—3 of Figure 2, looking in the direction of the arrows;

Figure 4 is a transverse cross-sectional view taken along the line 4—4 of Figure 2, looking in the direction of the arrows;

Figure 5 is a transverse cross-sectional view taken along the line 5—5 of Figure 2, looking in the direction of the arrows, and Figure 6 is an end elevational view of one of the reel clamping seats.

Referring now to the drawing in detail, wherein like reference numerals indicate like parts throughout the several figures, the reference numeral 10 indicates generally a fishing rod which may be solid or hollow, molded or otherwise formed from plastic, or other suitable fishing rod material. The fishing rod 10 has a shank 11 at one end and is carried by a handle 12 having a shank 11 receiving socket 13 formed in one end thereof. The handle 12 has a hand grip portion 14 adjacent the end opposite the socket 13.

A reel lock 15 is integrally formed with the handle 12 and is hollow as at 16. The hollow portion 16 is open at 17 and has facing grooves 18 and 19 formed at the bottom end edges thereof to receive the side edges of a reel base 20.

A reel clamping seat 21 is mounted beneath and forwardly of the hollow portion 16 and is provided with a pin 22 extending into the handle portion 12 of the rod 10. Reel seat 21 is provided with a transversely extending groove 23 to receive the end 24 of the base 20. A second reel seat 25 is positioned below and rearwardly of the hollow portion 16 and is provided with a pin 26 extending into the handle 12 to support the reel seat 25 thereon. Reel seat 25 is provided with a transversely extending groove 27 to receive the end 28 of the reel base 20. Reel base 20 has extending therefrom support members 29 to receive and carry the reel (not shown).

Referring now to the operation of the device, it should be noted in Figure 1 that the major axis a—a of the handle 12 extends at an angle to the minor axis b—b thereof with the minor axis b—b serving as the major axis for the rod 10. The axes a—a and b—b intersect midway of the hollow portion 16 of the reel lock 15 and it can be seen that by flexing the handle portion 12 upwardly with relation to the rod portion 10 that the axes a—a and b—b will be brought into axial alignment. At the same time the reel seat members 21 and 25 will be moved sufficiently far apart to permit the entry therebetween of the reel base 20. Release of the handle portion 12 will then cause the structure to attempt to assume the position as illustrated in Figure 1. However, with the reel base 20 in place, it is impossible for the original positions to be attained. However, a great amount of pressure is brought to bear upon the ends of the reel base 20. It should be noted also that any movement of the tip (not shown) of the rod 10 downwardly will merely cause additional pressure on the reel base 20. Hence, the pulling of a fish on the rod 10 will not in any way serve to dislodge the reel base 20.

The reel clamping elements 21 and 25 may be formed of metal or any other suitable material and secured in place in the reel lock 15 by means in addition to or instead of the pins 22 and 26, such as gluing, molding or otherwise securing to provide a substantial structure.

Having thus described the preferred embodiment of the invention, it should be understood that numerous modifications and structural adaptations may be resorted to without departing from the scope of the appended claims.

What is claimed is:

1. A fishing rod comprising a flexible elongated portion, a handle portion secured at one end to said elongated portion, said handle portion having a recess formed therein constituting a reel seat, a pair of reel base end engaging members disposed in said recess at the opposite ends thereof, said members each being formed with a transverse groove therein to receive the opposite end edges of said reel base, and means securing said members to said handle portion, said handle portion being formed of flexible material and being adapted to flex in the reel seat portion thereof to move said end engaging members toward and away from each other to releasably grip a reel base therebetween.

2. A device as claimed in claim 1 wherein said handle portion adjacent said reel seat is formed hollow to facilitate the flexing thereof to readily separate said reel base end engaging members permitting said reel base to be inserted therebetween.

3. A device as claimed in claim 1 wherein said handle portion is formed with sockets therein positioned at the opposite ends of said recess and wherein said means securing said reel engaging members comprise an integral pin on each of said members extending into said sockets.

References Cited in the file of this patent

UNITED STATES PATENTS

| 258,902 | Eggleston | June 6, 1882 |
| 942,030 | Austin | Nov. 30, 1909 |

FOREIGN PATENTS

| 1,038,421 | France | Sept. 28, 1953 |